(12) United States Patent
Allen

(10) Patent No.: US 6,602,330 B2
(45) Date of Patent: Aug. 5, 2003

(54) AIR PURIFICATION ASSEMBLY

(75) Inventor: Robert M. Allen, North Hollywood, CA (US)

(73) Assignee: Mark Miller, Westlake Village, CA (US)

(*) Notice: Subject to any disclaimer, the term of this patent is extended or adjusted under 35 U.S.C. 154(b) by 0 days.

(21) Appl. No.: 10/016,052

(22) Filed: Dec. 6, 2001

(65) Prior Publication Data

US 2002/0069759 A1 Jun. 13, 2002

Related U.S. Application Data

(60) Provisional application No. 60/251,546, filed on Dec. 7, 2000.

(51) Int. Cl.[7] .............................................. B03C 3/011
(52) U.S. Cl. ..................... 96/58; 55/385.3; 55/524; 55/528; 95/69; 95/79; 96/59; 96/66; 96/77
(58) Field of Search ................. 96/58, 97, 66, 96/68, 57, 77, 83, 95, 96, 59; 55/385.3, 524, 528; 95/69, 79

(56) References Cited

U.S. PATENT DOCUMENTS

| | | | | |
|---|---|---|---|---|
| 3,073,094 A | * | 1/1963 | Landgraf et al. | 96/66 |
| 3,738,088 A | * | 6/1973 | Colosimo | 96/26 |
| 3,804,942 A | * | 4/1974 | Kato et al. | 423/239.1 |
| 4,223,598 A | * | 9/1980 | Suzuki et al. | 454/156 |
| 5,035,728 A | * | 7/1991 | Fang | 96/19 |
| 5,055,115 A | * | 10/1991 | Yikai et al. | 96/59 |
| 5,433,772 A | * | 7/1995 | Sikora | 96/87 |
| 5,578,113 A | * | 11/1996 | Glenn | 96/52 |
| 5,614,002 A | * | 3/1997 | Chen | 96/55 |
| 5,622,543 A | * | 4/1997 | Yang | 96/58 |
| 5,656,063 A | * | 8/1997 | Hsu | 95/58 |
| 5,807,425 A | * | 9/1998 | Gibbs | 96/66 |
| 5,958,112 A | * | 9/1999 | Nojima | 96/55 |

* cited by examiner

Primary Examiner—Richard L. Chiesa
(74) Attorney, Agent, or Firm—Albert O. Cota

(57) ABSTRACT

An air purification assembly (10) that is adapted to be used in combination with a vehicle incorporating a heating, ventilation and air conditioning (HVAC) system (100). The assembly (10) consists of three elements: an electrostatic stabilizing filter (12), a membrane filter (32) and an electronic ionizer (40). The three assemblies (12, 32, 40) when operating in combination with the HVAC system (100) substantially absorb unpleasant odors, smoke, dust, pollen, mold spores, pet dander and particulate matter produced by a vehicle exhaust emissions.

15 Claims, 2 Drawing Sheets

AIR PURIFICATION ASSEMBLY

TECHNICAL FIELD

Applicant claims the benefit of Provisional Patent Application Ser. No. 60/251,546 filed on Dec. 7. 2000.

The invention pertains to the general field of air purification assemblies and more particularly to an air purification assembly adapted to be used in combination with a vehicle heating, ventilation and air conditioning (HVAC) system.

BACKGROUND ART

Air pollution is one of the most serious problems affecting the world today. It has been established by numerous studies that the air quality in the majority of large cities is constantly rated as un-healthy. In certain cities, the pollution is so prevalent that on some days local governments are forced to issue warnings, (i.e., "smog alerts") to the populace, especially the very young and old. An interesting fact concerning air pollution is that, as is commonly known, vehicles are one of the primary reasons for the pollution, but persons who are within their vehicles feel protected from the air outside. While this is partially true, especially when a vehicle is utilizing a climate control/air conditioning system which recycles the air inside the vehicle, there is no way to completely seal off a vehicle from outside air, another fallacy is that people believe their cars already have a completely effective air filtering system to clean the air that enters the car.

One of the most common methods of polluted air entering a vehicle is during times of heavy traffic, when cars and trucks are forced to stop very close to each other. Anyone who has ever been stopped in back of a large truck, and then had the truck blow exhaust directly at the front of their car, from a short distance, can appreciate this fact.

Unfortunately, many people choose to close their vehicle's outside air vent after polluted air has already entered their vehicle. From that point on, the vehicle's air conditioning system simply continues to re-cycle the polluted air through the vehicle repeatedly. Obviously, if there was some way to filter air once it has entered a vehicle, and continue filtering the air as it is circulated, it would be a great benefit for people everywhere.

A search of the prior art did not disclose any literature or patents that read directly on the claims of the instant invention.

DISCLOSURE OF THE INVENTION

The air purification assembly is designed to be used in a vehicle which has installed a heating, ventilation and air conditioning (HVAC) system which includes a return air duct and a fresh air duct. The air purification assembly consists of the following three elements that function in combination the HVAC system and with each other: an electrostatic stabilizing filter, a membrane filter and an electronic ionizer.

The electrostatic filter which is attached across the return air duct functions as a media stabilizer to provide filtration of the air prior to the air entering the HVAC system via the return air duct. The filter is designed to trap particulate matter up to three microns. The particulate matter trapped by the filter includes tobacco, smoke, dust pollen, mold spores, pet dander and particulate matter produced by vehicle exhaust emissions.

The membrane filter, which is attached to the surface of the electrostatic filter, is designed to absorb unpleasant odors and petrochemical-based toxins and by-products associated with vehicle exhaust emissions.

The electronic ionizer is attached to a vehicle structure which allows the ionizer to be positioned in close proximity to the return air duct. The ionizer is designed to condition and ionize the air, at a rate of 0.08 parts per million (ppm), prior to the air passing through the membrane filter, the electrostatic filter and through the return air duct of the HVAC system.

The air purification assembly is transferrable from one vehicle to another. However, the assembly is preferably designed to be permanently installed. When permanently installed, the assembly will function with no maintainability for a period of 24 months.

In view of the above disclosure, it is the primary object of the invention to produce an air purification assembly that filters and cleanses the air circulating through a vehicle passenger compartment. The filtering and cleansing is accomplished by utilizing three separate elements that operate in concert with each other and with the elements that comprise a factory installed heating, ventilation and air conditioning (HVAC) system.

In addition to the primary object of the invention it is also an object of the invention to produce an invention that:

Can be temporarily or permanently installed.

Is universally designed to allow the assembly to be installed in any vehicle having an HVAC system.

Has a long non-maintainability operating period.

Is cost effective from both a manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
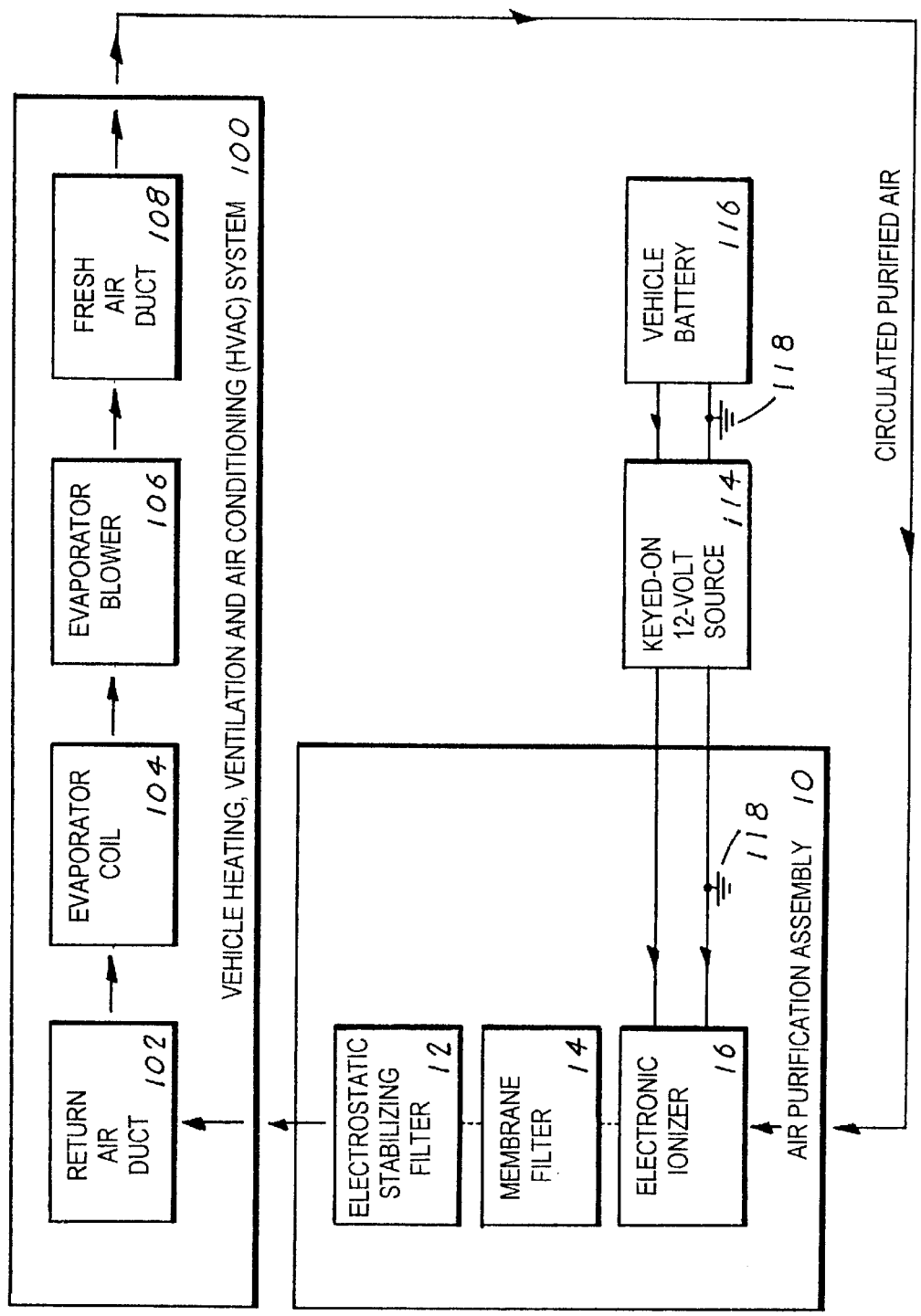
FIG. 1 is a block diagram showing the interface and the air flow between the air purification assembly and the vehicle heating, ventilation and air conditioning (HVAC) system.
Figure 2:
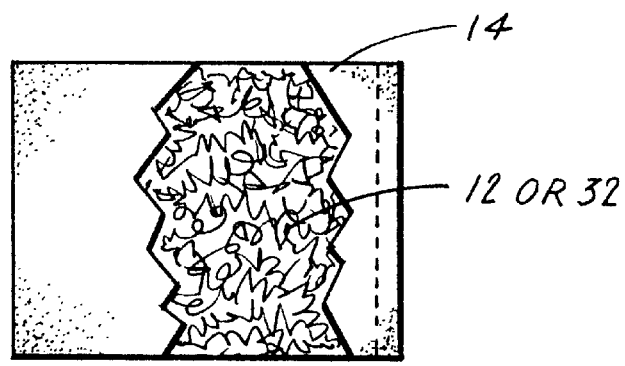
FIG. 2 is a front elevational view of an electrostatic stabilization filter or a membrane filter packaged in a hermetically sealed bag.
Figure 3:
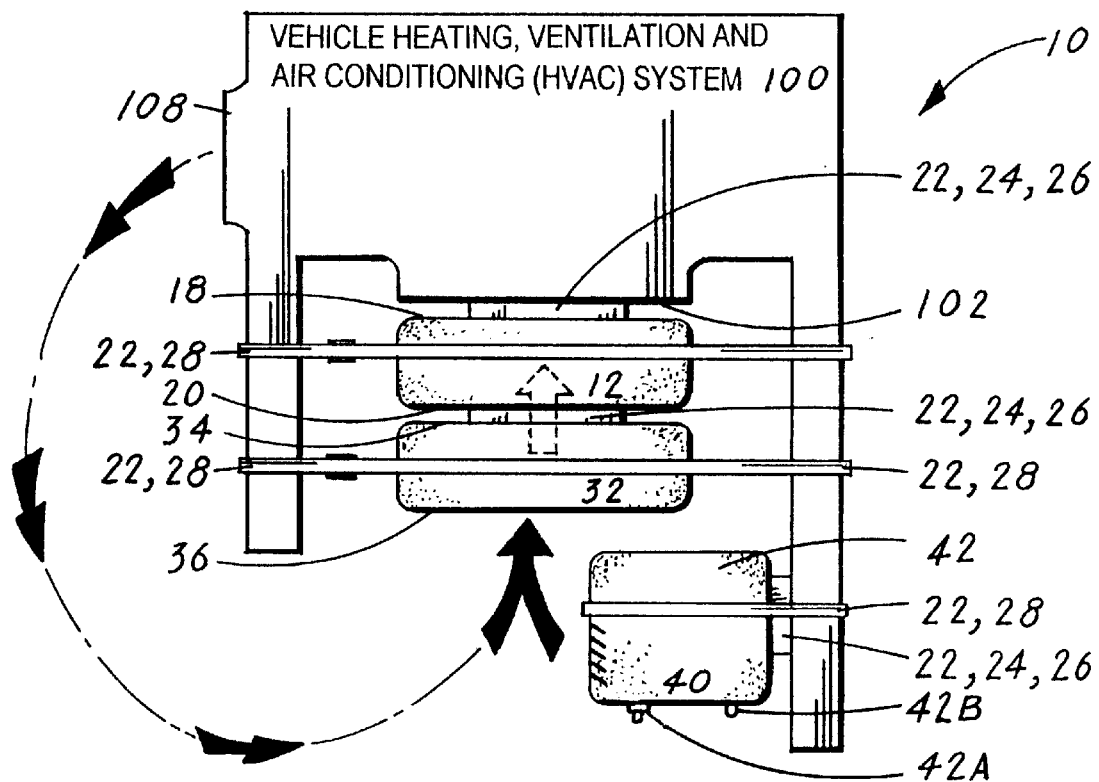
FIG. 3 is an illustration showing how the elements of the air purification assembly are attached to a vehicle structure surrounding the HVAC system.

The best mode for carrying out the invention is presented in terms of a preferred embodiment for an air purification assembly 10 that is adapted to be used in combination with a vehicle heating, ventilation and air conditioning (HAVC) system 100. The preferred embodiment, as shown in FIGS. 1, 2 and 3, is comprised of the following major elements: an electrostatic stabilizing filter 12, a membrane filter 32, and an electronic ionizer 40. The HVAC system 100 is typically comprised of a return air duct 102, an evaporator coil 104, an evaporator blower 106, and a fresh air duct 108 from where the purified air is dispersed and circulated through a vehicle passenger compartment 110.

The electrostatic stabilizing filter 12, as shown in FIGS. 1, 2 and 3, functions as the final air cleaning element of the air purification assembly 10, prior to the air entering the HVAC system 100. The filter 12 utilizes a filtration media that is comprised of fiberglass with cured urea-formaldehyde resin The filtration media is capable of attracting and trapping on contact, solid particulate matter up to three microns in size. The trapped particulate matter includes, but is not limited to, smoke, dust, pollen, mold spores, pet dander and particulate matter produced by vehicle exhaust emissions. The filter 12 allows the air circulating through the vehicle passenger compartment 110, via the HVAC system 100, to be relatively free of pollutants, thus allowing the circulated air to consist primarily of nitrogen and oxygen molecules.

The electrostatic stabilizing filter 12 has a length between 7–9 inches (17.8–22.9 cm), a width between 5–7 inches (12.7–17.8 cm) and a thickness between 0.375–0.625 inches (0.953–1.59 cm). The preferred dimensions include a length of 8 inches (20.32 cm), a width of 6 inches (15.24 cm) and a thickness of 0.5 inches (1.27 cm) To prevent filter contamination, prior to the filter 12 being installed as an element of the air purification assembly 10, the filter 12 packaged in a hermetically sealed bag 14, as shown in FIG. 2.

The filter 12 includes an inner side 18 and an outer side 20. The outer side 20, as shown in FIG. 3, is attached by an attachment means 22, to a vehicle structure 112 which is selected to allow the inner side 18 to be positioned across the return air duct 102. The attachment means 22 can consist of double-sided tape 24, a complimentary pair of hook and loop fasteners 26, plastic tie wraps 36 or a combination thereof.

The membrane filter 32, as shown in FIGS. 1, 2 and 3, is comprised of a powdered carbon that is applied to an inert media of expanded polypropylene. By using an expanded inert media, more surface area is available than is typically found on conventional flat filtration media. Therefore, the contact area of the membrane filter 32 is substantially increased to allow maximum filtration and absorption of unpleasant odors, petrochemical-based toxins and other by-products associated with automobile exhaust emissions.

The filter 32 has a length between 7–9 inches (17.8–22.9 cm), a width between 5–7 inches (12.7–17.8 cm) and a thickness between 1.75–2.25 inches (4.45–5.72 cm). The preferred dimensions include a length of 8-inches (20.32 cm), a width of 6-inches (15.24 cm) and a thickness of 1.125 (2.86 cm). To prevent filter contamination, the filter 32 is also packaged in a hermetically sealed bag 14, as shown in FIG. 2. As with the filter 12, the filter 32 is removed form the bag 14 prior to being installed as an element of the air purification assembly 10.

The filter 32 includes an inner side 34 and an outer side 36. The inner side 34, as shown in FIG. 3, is attached by an attachment means 22 against the outer side 20 of the electrostatic stabilizing filter 12. The attachment means 22 can consist of either double-sided tape 24, a complimentary pair of hook and loop fasteners 26 or a compatible adhesive (not shown).

The final element described for the air purification assembly 10 is the electronic ionizer 40 which is shown in FIGS. 1 and 3. The ionizer is packaged in a rigid plastic enclosure 42 that includes an ON/OFF switch 42A and an indicator light 42B that illuminates when the ionizer is operational. The enclosure 42 is attached, by an attachment means 22, to a vehicle structure 112 which is selected to allow the ionizer 40 to be positioned in close proximity to the return air duct 102, as shown in FIG. 3. The attachment means 22 can consist of double-sided tape 24, a complimentary pair of hook and loop fasteners 26, plastic tie wraps 28 or a combination thereof. After the ionizer 40 is physically attached, as shown in FIG. 3, it is electrically connected to a keyed-ON 12-volt source 114 that controls the application of the voltage from a vehicle battery 116. The ionizer 40 is designed to condition the air prior to the air entering the return air duct 102 and before the air is applied to and filtered by the electrostatic filter 12 and the membrane filter 32, The operational parameters of the ionizer 40 are as follows:

(a) Operating temperature: between 0–40 degrees Celsius.

(b) Current consumption: between 60–80 milliamperes.

(c) Operating voltage: 12-volts d-c.

When operated under the above parameters the ionizer 40 generates negative ions at a rate of 0.08 parts per million (ppm) which aid in eliminating or at least reducing static electricity from the assembly 10 components and process surfaces.

Operation of the Air Purification Assembly

When the keyed-ON 12-volt source is turned ON and the HVAC system 100 is turned ON and placed in a re-circulation mode, the air purification assembly 10 becomes operational. With the assembly 10 operational, the air from the fresh air duct 108 passes through the air purification assembly 10, is applied through the return air duct 102 and back into the fresh air duct 108, as shown in FIG. 1. Thus, the air in the vehicle passenger compartment is continuously re-circulated with purified air.

Installation of the Air Purification Assembly

The air purification assembly 10 is designed to be transferable from one vehicle to another. However, the assembly is preferably permanently installed in the vehicle. By permanently installing the assembly 10, no maintainability is required for a period of twenty-four months. To install the assembly 10, the following steps are followed:

(a) Disconnect the vehicle battery 116.

(b) Remove the vehicle glovebox and/or the under dash panel to access the return air duct.

(c) Remove the electrostatic stabilization filter 12 and the membrane filter 32 from their respective hermetically sealed bags 14.

(d) Attach the electrostatic stabilization filter 12, by an attachment means 22, to a vehicle structure 112 which allows the electrostatic stabilization filter 12 to be positioned across the return air duct 102.

(e) Attach the membrane filter 32, by an attachment means 22, which allows the membrane filter 32 to be positioned against the electrostatic stabilization filter 12.

(f) Attach the electronic ionizer 40, by an attachment means 22, to the vehicle structure 112 which allows the ionizer 40 to be positioned in close proximity to the return air duct 102.

(g) Connect the electronic ionizer 40 to the keyed-ON 12-volt source 114 and to a vehicle electrical ground 118.

(h) Reconnect the vehicle battery 116, turn the vehicle ignition switch to ON and set the vehicle air conditioning system to the air re-circulation mode to verify that the air purification assembly 10 is functioning.

(i) Replace the glovebox and/or the under dash panel.

While the invention has been described in complete detail and pictorially shown in the accompanying drawings it is not to be limited to such details, since many changes and modifications may be made to the invention without departing from the spirit and the scope thereof For example, the ionizer 40 can be designed with operational parameters that are more conducive for an ionizer that is to be used with an HVAC system that is installed in large trucks. Hence, it is described to cover any and all modifications and forms which may come within the language and cope of the claims.

What is claimed is:

1. An air purification assembly that operates in combination with a vehicle heating, ventilation and air conditioning (HVAC) system, which comprises a return air duct, an evaporator coil, an evaporator blower and a fresh air duct, said air purification assembly comprising:
   (a) an electrostatic stabilizing filter having an inner side and an outer side, wherein the outer side is attached, by an attachment means, to a vehicle structure which is selected to allow the inner side to be positioned across the return air duct,
   (b) a membrane filter having an inner side and an outer side, wherein the inner side is attached, by an attachment means, against the outer side of said electrostatic stabilization filter,
   (c) an electronic ionizer attached, by an attachment means, to a vehicle structure which is selected to allow said ionizer to be positioned in close proximity to the air return duct and to be connected to a keyed-ON 12-volt source, which is connected to a vehicle battery, wherein when the keyed-ON 12-volt source is turned ON and the HVAC system is turned ON and placed in a re-circulation mode, the air purification assembly becomes operational, at which time air from the fresh air duct passes through said air purification assembly, is applied through the return air duct and back into the fresh air duct to continuously re-circulate purified air through the vehicle passenger compartment.

2. The assembly as specified in claim 1 wherein said electrostatic stabilizing filter utilizes a filtration media capable of filtering particulate matter up to three microns in size.

3. The assembly as specified in claim 2 wherein the filtration media is comprised of fiberglass with cured urea-formaldehyde resin.

4. The assembly as specified in claim 3 wherein said electrostatic stabilization filter has a length between 7–9 inches (17.8–22.9 cm), a width between 5–7 inches (12.7–17.8 cm) and a thickness between 0.375–0.625 Inches (0.953–1.59 cm).

5. The assembly as specified in claim 4 wherein said electrostatic stabilization filter is packaged in a hermetically sealed bag, wherein said filter is removed from the bag prior to being installed in said assembly.

6. The assembly as specified in claim 1 wherein said membrane filter is comprised of a carbon-coating applied to a media of expanded polypropylene, wherein said membrane filter is designed to absorb unpleasant odors and petrochemical-based toxins and by-products associated with vehicle exhaust emissions.

7. The assembly as specified in claim 6 wherein said membrane filter has a length between 7–9 inches (17.8–22.9 cm), a width between 5–7 inches (12.7–17.8 cm) and a thickness between 1.75–2.25 inches (4.45–5.72 cm).

8. The assembly as specified in claim 7 wherein said membrane filter is packaged in a hermetically sealed bag, wherein said filter is removed form the package prior to being installed in said assembly.

9. The assembly as specified in claim 1 wherein the operational parameters of said electronic ionizer are as follows:
   (a) operating temperature: between 0–40 degrees Celsius,
   (b) current consumption: between 60–80 milliamperes,
   (c) operating voltage: 12-volts d-c.

10. The assembly as specified in claim 9 wherein said electronic ionizer is designed to generate negative ions at a rate of 0.08 parts per million (PPM).

11. The assembly as specified in claim 1 wherein said means for attaching said electrostatic stabilizing filter and said electronic ionizer comprises a double-sided tape, a complimentary pair of hook and loop fasteners, a plastic tie wrap or a combination thereof.

12. The assembly as specified in claim 1 wherein said means for attaching said membrane filter to said electrostatic filter comprises a double-sided tape or a complimentary pair of hook and loop fasteners.

13. A process for installing an air purification assembly in a vehicle, wherein said assembly comprises an electrostatic stabilization filter, a membrane filter and an electronic ionizer, and wherein said vehicle comprises a battery, a keyed-ON 12-volt source, a glovebox, an under dash panel, and a heating, ventilation and air conditioning system having a return air duct, a fresh air duct and which operates in an air recirculation mode, said process comprising the following steps:
   (a) disconnect the vehicle battery,
   (b) remove the glovebox and/or the under dash panel to access the return air duct,
   (d) remove said electrostatic stabilization filter and said membrane filter from their respective packages,
   (d) attach said electrostatic stabilization filter, by an attachment means, to a vehicle structure which allows said electrostatic stabilization filter to be positioned in close proximity to the return air duct,
   (e) attach said membrane filter, by an attachment means, which allows said membrane filter to be positioned against said electrostatic stabilization filter,
   (f) attach said electronic ionizer, by an attachment means, to the vehicle structure which allows said ionizer to be positioned adjacent the return air duct,
   (g) connect said electronic ionizer to the keyed-on 12-volt source and to a vehicle ground,
   (h) reconnect the vehicle battery, turn vehicle ignition switch to ON and set the air conditioning system to the air recirculation mode to verify that said air purification assembly is functioning, and
   (i) replace the glovebox and/or the under dash panel.

14. The process as specified in claim 13 wherein said means for attaching said electrostatic stabilizing filter and said electronic ionizer comprises a complimentary pair of hook and loop fasteners, a plastic tie-wrap or a combination of both.

15. The process as specified in claim 14 wherein said means for attaching said membrane filter to said electrostatic stabilizing filter comprises a complimentary pair of hook and loop fasteners.

* * * * *